United States Patent [19]
Nielsen et al.

[11] 3,863,604
[45] Feb. 4, 1975

[54] STANCHION PANEL

[76] Inventors: Floyd P. Nielsen, 5650 W. Bethany Home Rd., Glendale, Ariz. 85301; Bernard O. Anderson, 5341 W. Banff Ln., Phoenix, Ariz. 85306

[22] Filed: Aug. 23, 1973

[21] Appl. No.: 390,859

[52] U.S. Cl. .............................................. 119/148
[51] Int. Cl............................................. A01k 1/06
[58] Field of Search..................... 119/148, 147, 149

[56] References Cited
UNITED STATES PATENTS

| 549,965 | 11/1895 | Howard | 119/148 |
|---|---|---|---|
| 1,128,769 | 2/1915 | Ferris et al. | 119/148 |
| 1,519,429 | 12/1924 | Yaggy | 119/148 |
| 2,625,907 | 1/1953 | Montero | 119/148 |

Primary Examiner—Hugh R. Chamblee
Attorney, Agent, or Firm—Clarence A. O'Brien; Harvey B. Jacobson

[57] ABSTRACT

A pair of upper and lower elongated horizontal supports are provided and interconnected by means of upstanding stationary bars extending between and secured to the upper and lower members at points spaced longitudinally therealong. The spacing between at least one pair of adjacent bars is sufficient to receive the head of an animal therethrough and a supplemental upstanding gate member is disposed between these stationary gate bars with the lower end of the gate member supported from the lower horizontal member or support for angular displacement about a horizontal axis extending transverse to the lower support and the upper end of the gate member oscillatable lengthwise of the upper support. An actuator is guidingly supported for movement along the upper support and operatively connected to the upper end of the gate member for oscillating the latter in response to shifting of the actuator lengthwise of the upper support.

3 Claims, 6 Drawing Figures

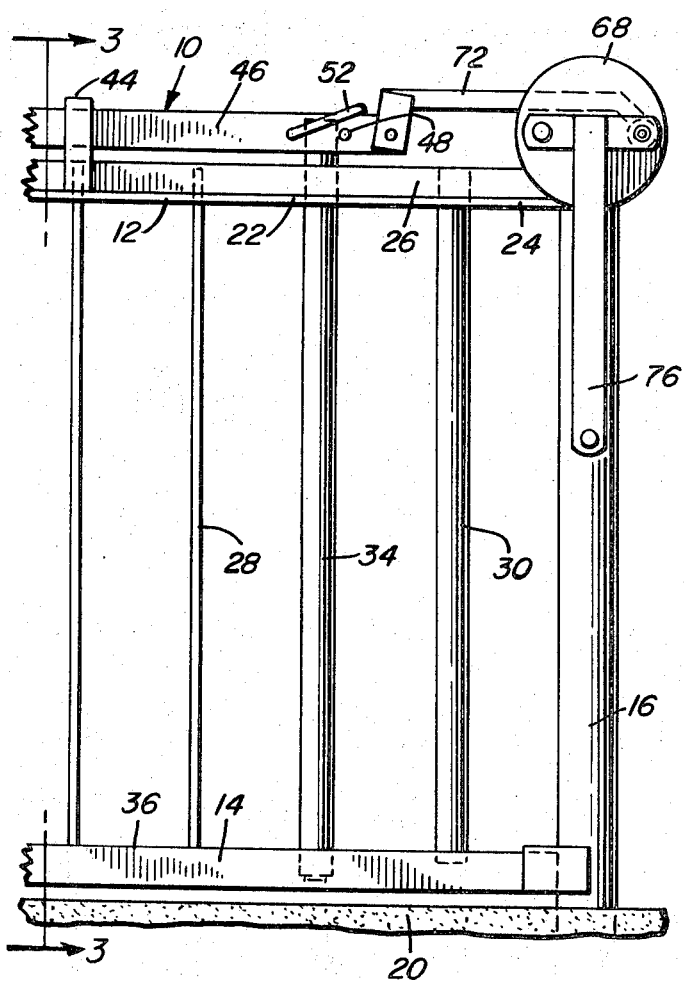
Fig. 2
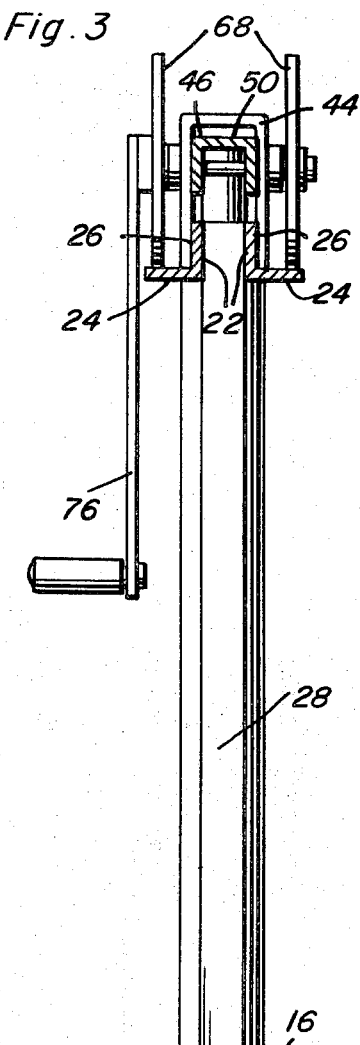
Fig. 3
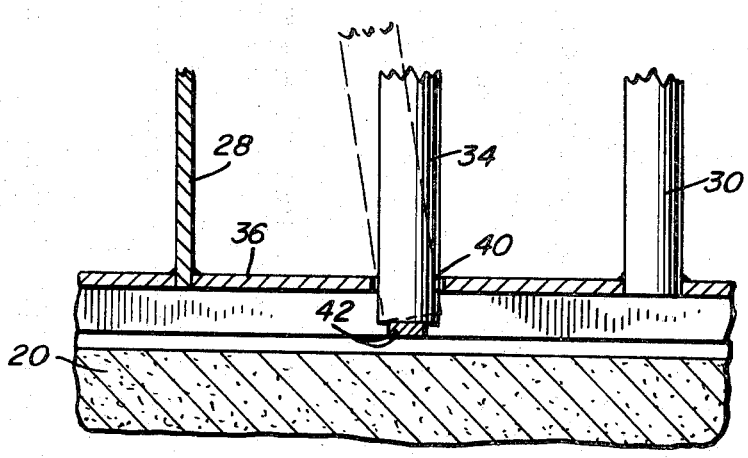
Fig. 4
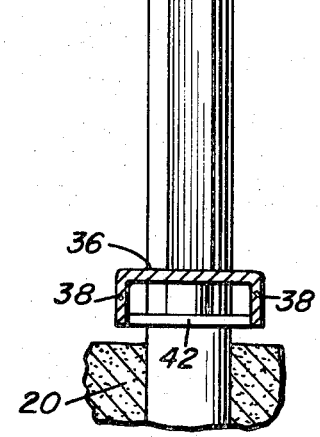

3,863,604

STANCHION PANEL

The stanchion gate of the instant invention has been primarily designed to provide a means whereby a gang-type stanchion gate assembly may be provided with the assembly comprising end-to-end aligned and connected horizontally elongated stanchion gate sections each defining a plurality of stanchion gates and with a single actuator being operable to simultaneously shift the gate members of the end-to-end connected stanchion gate sections between the open and closed positions.

Further, the individual stanchion gate sections which may be coupled together in substantially unlimited number in order to form an extremely long gang-type stanchion gate assembly are each constructed alike and in a manner enabling ready handling, transport and storage in stacked relation. In addition, each stanchion gate section is constructed of components which are commercially available at low cost and which may be readily fabricated into the end product desired with the latter enjoying a long life of trouble-free operation after installation.

The main object of this invention is to provide a stanchion gate assembly which may be readily constructed of a plurality of end-to-end aligned and connected horizontally elongated stanchion gate assemblies, whereby an extremely large gang-type stanchion gate assembly may be readily manufactured, transported and erected on the site at a reasonably low cost.

Still another object of this invention is to provide a stanchion gate assembly which may be fabricated of readily available low cost components.

Another important object of this invention is to provide a stanchion gate assembly in accordance with the preceding objects and including features enabling an assembled gang type stanchion gate assembly to have all of the upstanding gate members thereof simultaneously shifted between open and closed positions upon operation of a single actuator.

A final object of this invention to be specifically enumerated herein is to provide a stanchion gate assembly in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

FIG. 2 is a fragmentary enlarged side elevational view of the right end of the stanchion gate section illustrated in FIG. 1, but with the endmost gate member in a closed position as opposed to the open positions of the gate members illustrated in FIG. 1;

FIG. 3 is a fragmentary enlarged transverse vertical sectional view taken substantially upon the plane indicated by the section line 3—3 of FIG. 2;

FIG. 4 is a fragmentary enlarged longitudinal vertical sectional view illustrating the manner in which the lower ends of the shiftable gate members of the assembly may be oscillated between the open and closed positions thereof;

FIG. 5 is a fragmentary enlarged longitudinal vertical sectional view illustrating the manner in which the operator for the stanchion gate actuator is operably connected thereto; and FIG. 6 is an exploded perspective view of one end portion of the actuator illustrating the manner in which the individual oscillatable gate members are releasably anchored thereto.

Figure 1:
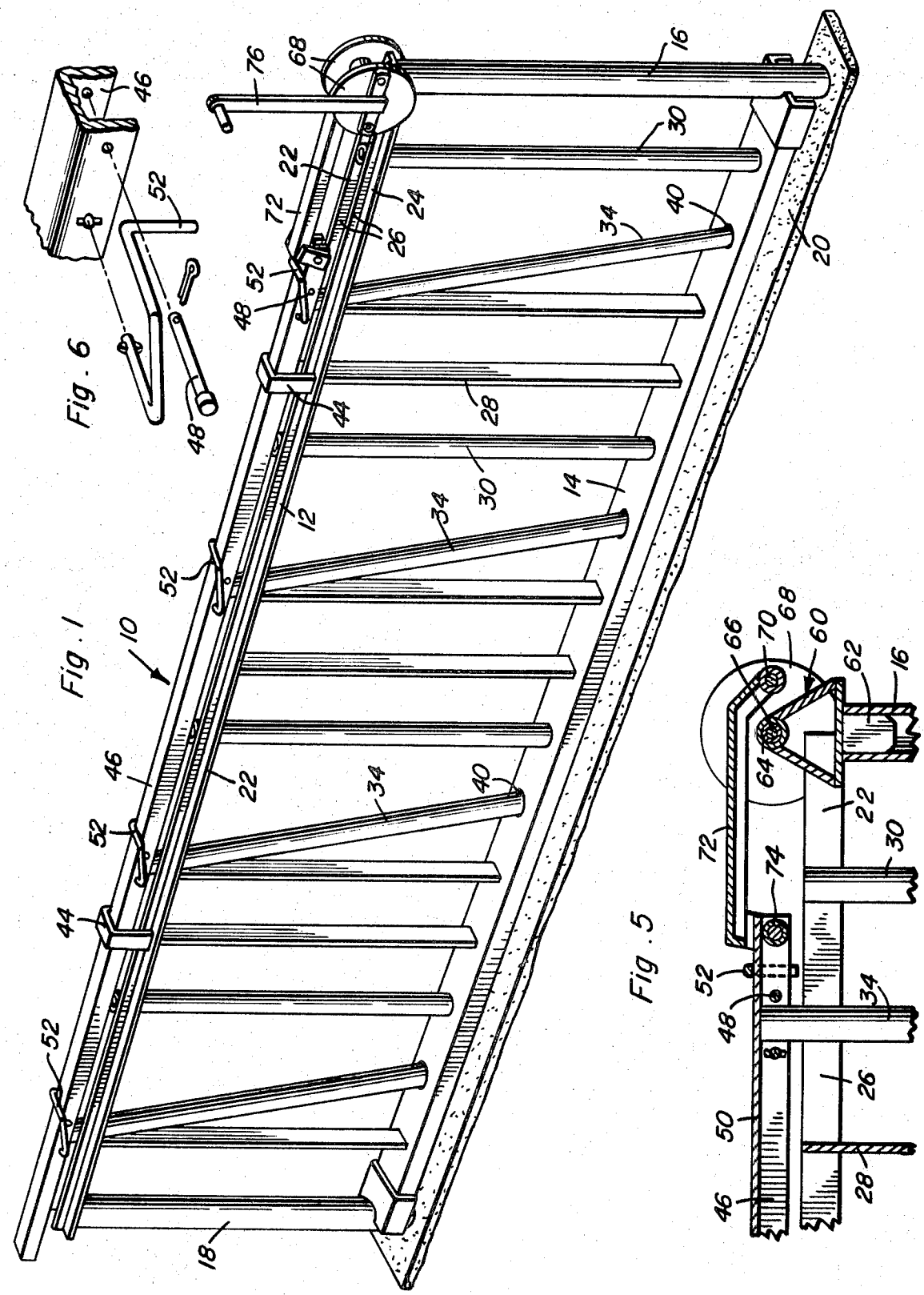
FIG. 1 is a perspective view of a single stanchion gate section constructed in accordance with the present invention and which may be utilized in gang-type end-to-end aligned and connected relation so as to provide a stanchion gate assembly of substantially any length.

Referring now more specifically to the drawings, there may be seen a stanchion gate section constructed in accordance with the present invention and designated by the reference numeral 10 in FIG. 1. The section 10 includes upper and lower horizontal support members 12 and 14 which extend between opposite end upstanding posts 16 and 18 whose lower ends may be embedded in a concrete foundation 20.

The upper and lower support members 12 and 14 may be secured to the posts 16 and 18 in any convenient manner and are preferably connected to the posts 16 and 18 in a manner such that additional sections 10 may be added to the overall assembly on the remote sides of the posts 16 and 18 with each additional section 10 added to the overall assembly being longitudinally aligned with the other sections of the assembly.

The upper support member 12 comprises a pair of opposite side angle members 22 whose corresponding ends are secured to opposite side portions of the posts 16 and 18. The angle members 22 generally parallel each other and are slightly laterally spaced apart. Further, the angle members 22 include laterally outwardly directed lower horizontal flanges 24 and adjacent upwardly projecting vertical flanges 26.

A plurality of upstanding bars 28 and pipes 30 have their lower ends fixedly attached to the lower support member 14 and their upper ends fixedly attached between the angle members 22. The manner of securement of the bars 28 and 30 to the members 14 and 22 may be by welding.

In addition to the bars and pipes 30 a plurality of upstanding gate members 34 extend between the lower support 14 and the upper support 12. The lower support 14 comprises an inverted channel member including an upper bight portion 36 and depending opposite side flanges 38 and the bight portion 36 is provided with longitudinally spaced openings 40 and cross abutment braces 42 are secured between the lower marginal edge portions of the flanges 38 in vertical registry with the apertures 40. The tubular gate members 34 are of a diameter slightly smaller than the diameter of the apertures 40 and the lower ends of the gate members 34 are loosely received through the apertures 40 and abut the cross braces or members 42. The upper ends of the gate members 34 are slidably received between the upstanding flanges 26 of the angle members 22 and the upper ends of the gate members 34 project above the angle members 22.

A pair of inverted U-shaped guides 44 are welded to, project above and interconnect the upstanding flanges 26 of the angle members 22 at points spaced longitudinally therealong. An inverted channel-shaped actuator 46 is disposed above the angle members 22 and is guidingly received through the guides 44. In addition, a plurality of stop pins 48 are secured through the inverted channel-shaped actuator 46 at points spaced longitudinally therealong and the upper ends of the gate members 34 are disposed on corresponding sides of the abutment pins 48 with the underside of the bight portion of the actuator 46 resting upon the upper ends of the gate members 34. In addition to the abutment pins 48, U-shaped lock pins are removably secured through the inverted channel-shaped actuator on the sides of the upper ends of the gate members 34 remote from the pins 48 and thus the upper ends of the guide members 34 are retained captive between the corresponding pair of pins 48 and 52 for oscillation with the actuator 46 when the latter is shifted longitudinally of the section 10.

An upwardly projecting mount referred to in general by the reference numeral 60 includes a depending shank portion 62 which is removably downwardly telescoped in the post 16 for stationary support of the mount 60 from the post 16. The upper portion of the mount 60 defines a bearing journal 64 through which a shaft 66 is journaled and the opposite ends of the shaft 66 have disks 68 secured thereto for rotation therewith. A crankpin 70 extends and is secured between corresponding outer peripheral portions of the disks 68 and one end of a connecting rod 72 is journaled on the pin 70 while the other end of the connecting rod 72 is bifurcated and pivotally attached to the adjacent end of the inverted channel-shaped actuator 46 as at 74. Still further, a hand crank 76 is provided and is removably attached to one of the disks 68. Further, the crank 76 may be removably secured to either of the disks 68 whereby the operating crank 76 may be operated either by the left hand or by the right hand of a person standing at the right-hand end of the section 10 illustrated in FIG. 1.

With attention now invited more specifically to FIG. 1 of the drawings, it may be seen that the gate members 34 are in the open positions. However, upon rotation of the crank 76 through an arc of approximately 180° the actuator 46 may be shifted to the right so as to swing the upper ends of the gate members 34 to the right into vertical positions such as those illustrated in FIG. 2 of the drawings. When in vertical positions the gate bars 34 are closed and the animals having their necks disposed between the gate members 34 and the adjacent pipes 30 may not withdraw their heads from the stanchion gate section 10.

It will also be noted that the mount 60 is removably supported from the post 16 and that the supports 12 and 14 are secured to only the adjacent side of each post 16 and 18, thereby enabling the supports 12 and 14 of additional sections 10 to be secured to the other sides of the posts 16 and 18. When a plurality of sections 10 are secured together in end-to-end aligned relation any suitable connecting member (not shown) may be utilized to connect adjacent ends of the various actuators 46 in order that a single operator including the components 60, 62, 64, 66, 68, 70 and 72 may be utilized to simultaneously shift all actuators 46 of a gang-type stanchion gate assembly.

Inasmuch as the lock pins 52 are readily removable, a selected lock pin 52 may be removed when the gate members 34 are all in the closed positions in order to release the associated gate member for movement to the open position, in the event it is desired to open an individual gate.

The crank 76 is removably supported from the corresponding disk 68 and therefore it may be appreciated that a plurality of sections 10, independent of the posts 16 and 18, may be compactly stacked and handled as well as shipped while in stacked relation. In addition, suitable jigs may be readily fabricated in order to provide the necessary apertures in the inverted channel-shaped actuator 46 and the various openings required in the bight portion 36 of the lower support 14. Therefore, it may be seen that fabrication of the sections 10 may be carried out on a production scale at a very low cost.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A stanchion gate assembly including at least one horizontally elongated and upstanding stanchion assembly, said assembly comprising vertically spaced generally horizontal upper and lower elongated supports interconnected at corresponding ends by means of upstanding end members extending and secured between said corresponding ends, a plurality of pairs of generally vertical spaced apart adjacent bars spaced along said assembly and extending between and rigidly connected to said supports, each pair of adjacent bars defining gate bars and being spaced apart a distance sufficient to receive the head of an animal therebetween, and a supplemental upstanding gate member disposed between the bars of each pair of adjacent bars with the lower ends of said gate members supported from said lower support intermediate the corresponding pair of adjacent bars for angular displacement about a horizontal axis transverse to said lower support and with the upper end of said gate member oscillatable lengthwise of said upper support, an actuator guidingly supported from said assembly for horizontal reciprocation therealong and operatively connected to the upper ends of said gate members for oscillating said upper ends in response to reciprocation of said actuator, said lower support member comprising an inverted channel-shaped member, the lower ends of said vertical bars being secured through bores formed through the upper bight portion of said inverted channel member, said bight portion additionally having apertures formed therein through which the lower ends of said gate members are loosely received, and a transverse brace secured between the opposite sides of said inverted channel-shaped member spaced below and in vertical registry with each of said apertures, the lower ends of said gate members resting upon said braces.

2. The combination of claim 1 wherein said upper member comprises laterally spaced longitudinal members between which the upper ends of said bars are rigidly secured, the upper ends of said gate members being slidably received between said longitudinal members, the uppper ends of said gate members projecting above said laterally spaced longitudinal members, said actuator being elongated and attached to the upper ends of said gate members projecting above said longitudinal members, said actuator comprising a horizontally elongated inverted channel bar including depending opposite side flanges between which the upper ends of said gate members are received, said channel bar including a horizontal bight portion extending between the upper portions of said side flanges and including longitudinally spaced undersurface portions supportingly abutted against the upper ends of said gate members, a first pin secured through said flanges on one side of the upper end of each gate member and a second pin removably secured through said flanges on the other side of the upper end of each gate member.

3. The combination of claim 2 including a plurality of inverted U-shaped guides spaced along said upper member and including downwardly projecting legs whose lower end portions are rigidly attached to remote side surface portions of corresponding portions of said laterally spaced longitudinal members, said inverted channel bar being slidably received between the legs of said guides.

* * * * *